United States Patent
Lin et al.

(10) Patent No.: US 10,026,348 B2
(45) Date of Patent: Jul. 17, 2018

(54) DRIVING SCHEME FOR HIGH BRIGHTNESS AND FAST RESPONSE PANEL FLASH

(71) Applicant: Apple Inc., Cupertino, CA (US)

(72) Inventors: Hung Sheng Lin, San Jose, CA (US); Chin-Wei Lin, San Jose, CA (US); Hyunwoo Nho, Stanford, CA (US)

(73) Assignee: APPLE INC., Cupertino, CA (US)

( * ) Notice: Subject to any disclaimer, the term of this patent is extended or adjusted under 35 U.S.C. 154(b) by 61 days.

(21) Appl. No.: 15/179,896

(22) Filed: Jun. 10, 2016

(65) Prior Publication Data
US 2017/0263173 A1  Sep. 14, 2017

Related U.S. Application Data

(60) Provisional application No. 62/307,086, filed on Mar. 11, 2016.

(51) Int. Cl.
*G09G 3/20* (2006.01)

(52) U.S. Cl.
CPC .......... *G09G 3/2003* (2013.01); *G09G 3/2092* (2013.01); *G09G 2320/0626* (2013.01)

(58) Field of Classification Search
CPC ............ G09G 3/30–3/3291; G09G 2320/0626
See application file for complete search history.

(56) References Cited

U.S. PATENT DOCUMENTS

| | | | |
|---|---|---|---|
| 6,693,385 B2 * | 2/2004 | Koyama | G09G 3/2022 315/169.1 |
| 7,746,313 B2 | 6/2010 | Goto et al. | |
| 8,760,477 B2 | 6/2014 | Hudson et al. | |
| 9,134,825 B2 | 9/2015 | Chaji | |
| 2003/0174106 A1 * | 9/2003 | Tanada | G09G 3/3258 345/83 |
| 2005/0237286 A1 * | 10/2005 | Tanada | G09G 3/3225 345/77 |
| 2008/0284774 A1 * | 11/2008 | Yamashita | G09G 3/3233 345/212 |
| 2014/0218421 A1 * | 8/2014 | Lee | G09G 3/2011 345/692 |

* cited by examiner

*Primary Examiner* — Liliana Cerullo
(74) *Attorney, Agent, or Firm* — Rutan & Tucker, LLP

(57) ABSTRACT

Driving methods and display systems are described for operating a display panel in flash mode. In an embodiment, the driving method includes time multiplexing between at least two panel operation voltage ($V_{OP}$) levels including a first $V_{OP}$ level and a second $V_{OP}$ level across all Vdd input lines to a display area, and emitting a first wavelength range from a first subpixel group during application of the first $V_{OP}$ level across all of the Vdd input lines and emitting a second wavelength range from a second subpixel group during application of the second $V_{OP}$ level across all of the Vdd input lines.

17 Claims, 8 Drawing Sheets

Sequential Flash

Mono Flash

Sequential Flash

Sequential Flash

DRIVING SCHEME FOR HIGH BRIGHTNESS AND FAST RESPONSE PANEL FLASH

CROSS-REFERENCE TO RELATED APPLICATIONS

This application claims the benefit of priority from U.S. Provisional Application No. 62/307,086, filed on Mar. 11, 2016, which is incorporated herein by reference.

BACKGROUND

Field

Embodiments described herein relate to display driving schemes. More particularly, embodiments describe display systems and methods for operating display panel as a flash source.

Background Information

Cameras commonly include a light source to produce a flash of artificial light for illumination of a target object. Typically a flash is built into a camera as a separate unit. Many mobile devices, such as camera phones, or smart phones, now commonly include a camera and separate flash, in addition to a display panel. More recently display devices have been introduced in which the display panel can be utilized as the flash source, which may eliminate the need for a separate flash unit.

SUMMARY

Embodiments describe display systems and methods for operating a display panel as a flash source, for example, in a sequential flash mode. In an embodiment, a method of driving a display panel in a sequential flash mode includes time multiplexing between at least two panel operation voltage ($V_{OP}$) levels including a first $V_{OP}$ level and a second $V_{OP}$ level across all Vdd input lines to a display area, and emitting a first wavelength range from a first subpixel group during application of the first $V_{OP}$ level across all of the Vdd input lines and emitting a second wavelength range from a second subpixel group during application of the second $V_{OP}$ level across all of the Vdd input lines. In some embodiments, one or more display system processing units may run various software components stored in medium to perform various functions for system, such as operating a display panel as a flash source, for example, in a sequential flash mode In an embodiment, the method of operating the display panel as a flash source includes applying a second $V_{OP}$ level across all of the Vdd input lines for a longer period of time than the first $V_{OP}$ level is applied across all of the Vdd input lines. The method may additionally include time multiplexing to a third $V_{OP}$ level between the first $V_{OP}$ level and the second $V_{OP}$ level, where the third $V_{OP}$ level is lower than both the first $V_{OP}$ level and the second $V_{OP}$ level. For example, the third $V_{OP}$ level may be 0 volts. In accordance with embodiments, data content for the second subpixel group may be updated during application of the third $V_{OP}$ level and prior to application of the second $V_{OP}$ level.

The display panel may be operated with a rapid display refresh rate in accordance with embodiments. For example, refresh may be simultaneously started for a first plurality of rows within the display area during application of the first $V_{OP}$ level across all of the Vdd input lines.

Refresh may additionally be simultaneously started for a second plurality of rows within the display area during application of the second $V_{OP}$ level across all of the Vdd input lines.

Color tuning may be performed by modulating emission pulse width in accordance with embodiments. For example, a pulse length from the emission controller can be modulated to a corresponding subpixel group. In an embodiment, the end of the emission pulse width of the corresponding subpixel group corresponds to an end of the pulse length from the emission controller to the subpixel group.

Color tuning may be performed by modulating the current source in accordance with embodiments. For example, a current source pulse width to all driving transistors of a corresponding subpixel group may be modulated. In an embodiment, an end of the emission pulse width of first subpixel group corresponds to an end of the pulse length of the current source pulse width to all of the driving transistors of the subpixel group.

In an embodiment, a display system includes a display panel, a power management, and voltage source coupled to the power management unit. The display panel includes a plurality of Vdd input lines and a plurality of Vss lines. The power management unit is coupled to the plurality of Vdd input lines and the plurality of Vss lines. The power management unit includes one or more selection devices to select a plurality of voltage source levels from the voltage source, and to provide a plurality of different Vdd–Vss ($V_{OP}$) voltage levels across the plurality of Vdd input lines and the plurality of Vss lines. The display panel may additionally include a plurality of data input lines. In an embodiment, the display system includes a display driver coupled to the plurality of data input lines. The display system may additionally include an emission controller, with the display driver coupled to the emission controller and the power management unit.

DETAILED DESCRIPTION

Figure 1:
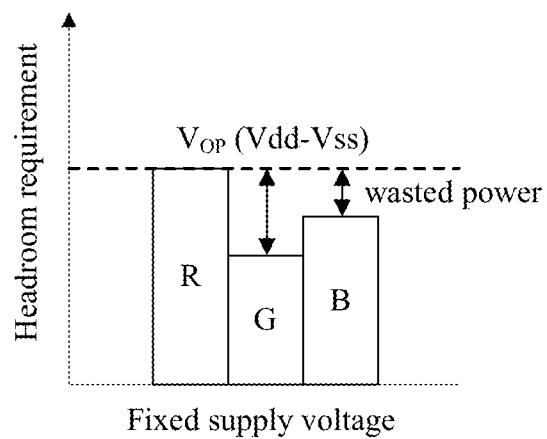
FIG. 1 is a graphical illustration of headroom requirement of a display panel operated with fixed panel operation voltage.

Embodiments describe a display system and methods of driving a display panel in which the display panel is used as a flash source. Specifically the display panel may operate in a sequential flash mode in which different color emitting subpixels are sequentially emitted.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known techniques and components have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

In an embodiment, a method of driving a display includes time multiplexing between a plurality of panel operation voltage ($V_{OP}$) levels (e.g. red, green, blue subpixel panel $V_{OP}$ levels). In accordance with embodiments, the different $V_{OP}$ levels are applied across all of the Vdd input lines and all of the Vss lines. Thus, different panel $V_{OP}$ levels are applied across the entire display area, while only specific subpixel groups are selected for emission corresponding to a specific panel $V_{OP}$ level. More specifically, an exemplary panel $V_{OP}$ level for red emission is applied across the entire panel, while only red-emitting subpixels are emitting, and so forth for other colors such as green and blue in an exemplary RGB pixel arrangement.

It has been observed when using pixel-level emissive light emitting diodes (LEDs) of a display panel as the flash source that the supply voltage requirement of the display includes IR drop, headroom margin of the current source, and operation voltage of the LEDs. Operation of such a display panel in flash mode may generally correspond to a high transient emission power while maintaining luminance and color accuracy. IR drop and headroom margin can add additional power management and panel design requirements. Insufficient power delivery to the display panel may cause color shift or luminance drop. In addition, high voltage and high transient current can potentially cause the battery to shut down or enter into protection mode.

In accordance with embodiments, dynamic driving modes are described that may reduce emission power supply and lower the flash power consumption while maintaining whole screen peak luminance. In an embodiment, a sequential flash is utilized, which may allow for short flash time and color balancing. Color balancing may additionally be obtained by modulating emission pulse width (e.g. emission clock modulation, or current source pulse width to the driving transistors) or by pulsing the panel $V_{OP}$ levels.

By way of illustration FIG. 1 is a graphical illustration of headroom requirement of a display panel operated with fixed panel operation voltage. As illustrated in FIG. 1, red, green, and blue-emitting subpixel groups are operated in a sequential flash mode. The headroom requirement for the display panel may correspond to the maximum panel $V_{OP}$ level, which corresponds to the Vdd–Vss differential across the display panel. Since the different subpixel groups may have different turn ON and emission voltage requirements, maintaining a constant panel $V_{OP}$ level may correspond to wasted power.

Figure 2:
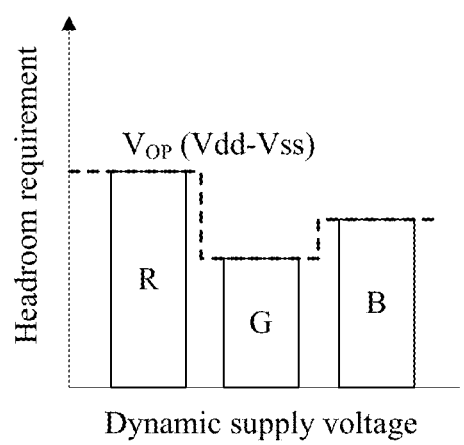
FIG. 2 is a graphical illustration of headroom requirement of a display panel operated with dynamic panel operation voltage in accordance with an embodiment.

In accordance with embodiments, time multiplexing of the panel $V_{OP}$ level may be used for fine tuning of color accuracy. FIG. 2 is a graphical illustration of headroom requirement of a display panel operated with dynamic panel operation voltage in accordance with an embodiment. As illustrated in FIG. 2, red, green, and blue-emitting subpixel groups are operated in a sequential flash mode, with a dynamic panel $V_{OP}$ level applied depending upon the particular subpixel group that is designated for emission. In this manner, the wasted power associated with the headroom requirement at a constant panel $V_{OP}$ level is mitigated.

Figure 3:
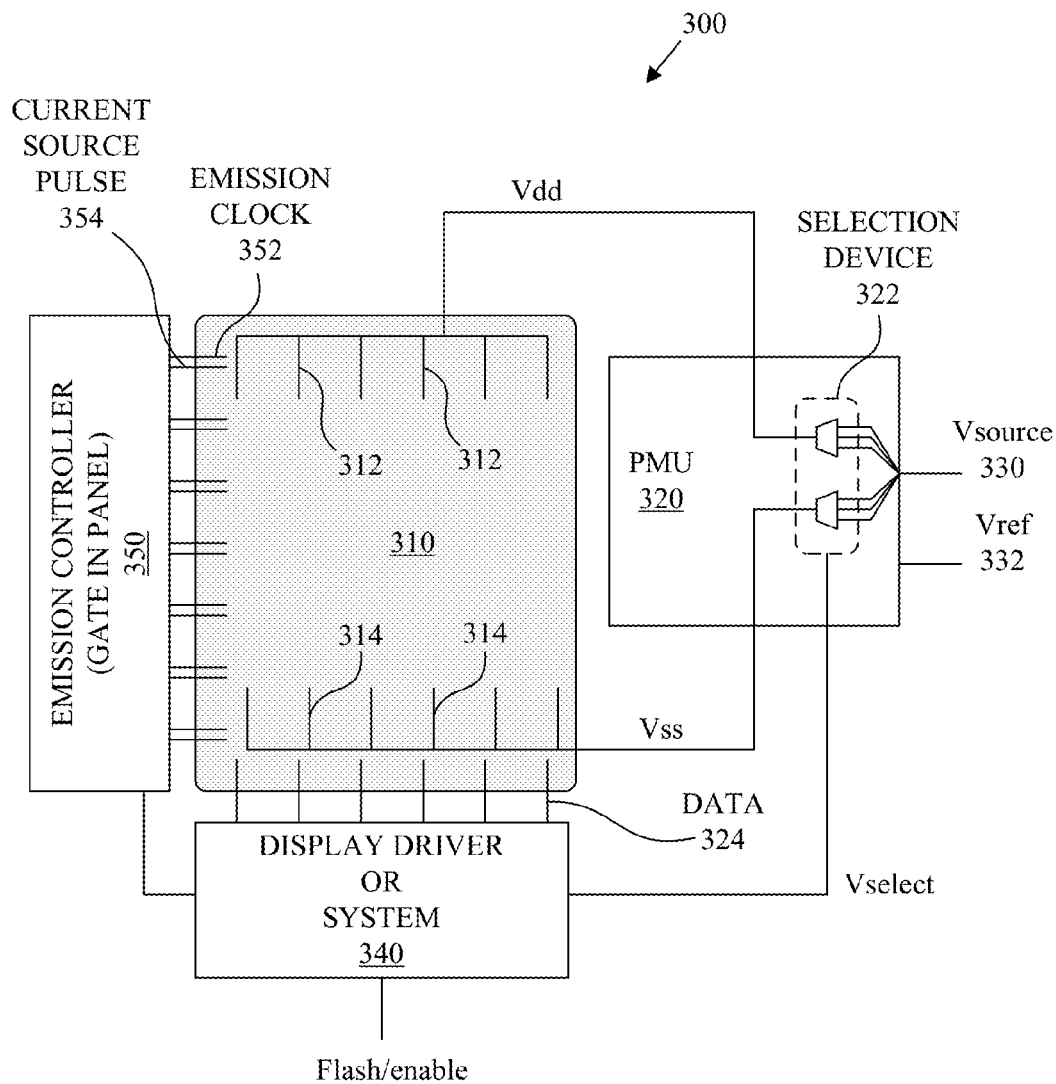
FIG. 3 is a schematic illustration of a display system in accordance with an embodiment.

Referring now to FIG. 3 a schematic illustration of a display system is provided in accordance with an embodiment. As shown, the display system 300 may include a display panel 310 and power management unit 320. The display panel 310 includes a plurality of Vdd input lines 312 and a plurality of Vss input lines 314 for providing the dynamic panel $V_{OP}$ level to the subpixels. The power management unit 320 is coupled to the plurality of Vdd input lines 312 and the plurality of Vss lines 314. A voltage source (Vsource) 330 and reference voltage (Vref) 332 may be coupled to the power management unit 320. In an embodiment, the power management unit 320 includes one or more selection devices 322 to select from a plurality of voltage source levels from the voltage source 330, and to provide one of the plurality of the dynamic $V_{OP}$ levels across the plurality of Vdd input lines 312 and the plurality of Vss lines 314.

The display system 300 may additionally include a display driver (or system driver) 340 coupled to a plurality of data input lines 342 on the display panel 310, and an emission controller (gate in panel) 350 coupled to a plurality of emission clock lines 352 and/or current source pulse lines 354 on the display panel 310. The display driver 340 may be coupled to the power management unit 320 to provide a select signal (Vselect) to the one or more selection devices 322 in order for the power management unit 320 to provide the dynamic panel $V_{OP}$ levels to the display panel 310. The display driver 340 may additionally be coupled to the emission controller 350.

Figure 4:
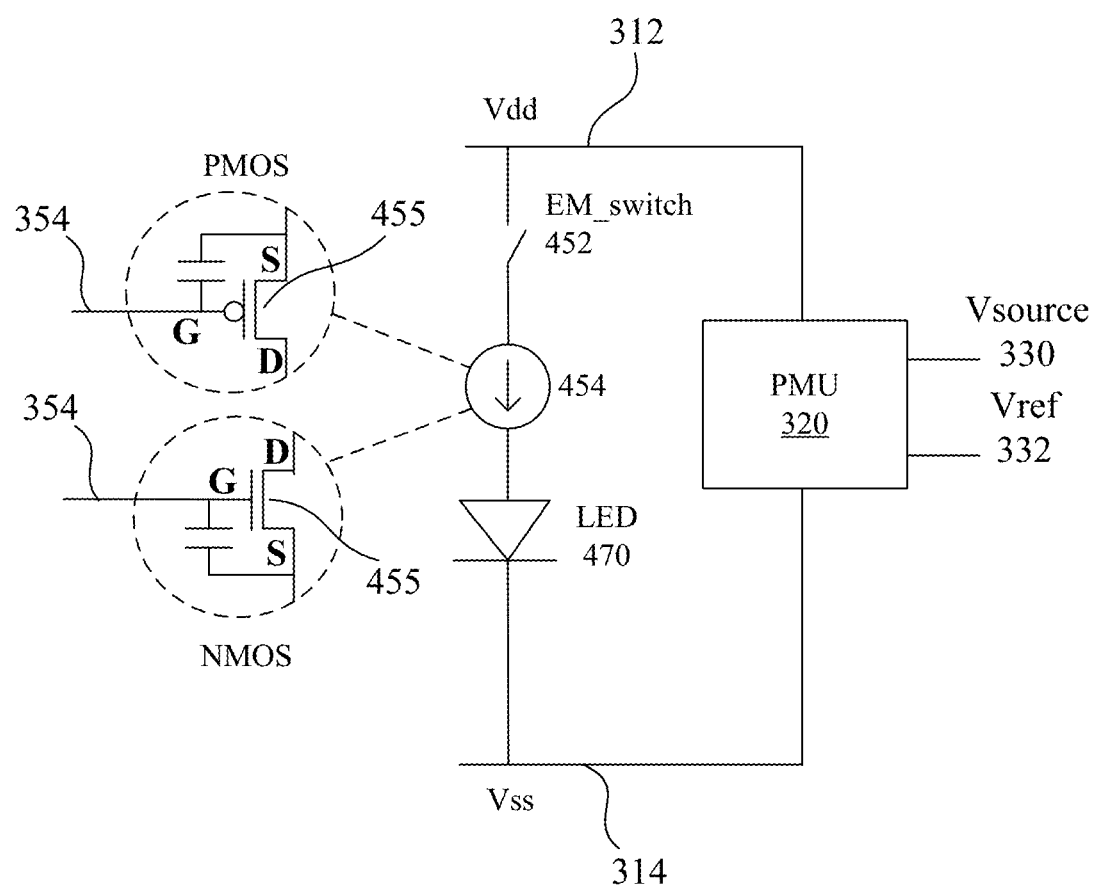
FIG. 4 is an illustration of subpixel circuitry in accordance with an embodiment.

FIG. 4 is an illustration of subpixel circuitry in accordance with an embodiment. As shown, each subpixel may include an LED 470, current source 454, and optionally an emission switch 452 between corresponding Vdd lines 312 and Vss lines 314 that are coupled to the power management unit 320. In the particular embodiment illustrated, exemplary NMOS and PMOS circuitries are provided for the current source 454, though these are exemplary and other current source circuitries may be used.

It has been observed that the supply voltage requirement ($V_{OP}$ level) of a display may include IR drop associated with the emission switch 452, headroom margin of the current source 454, and operation voltage of the LED 470. In an embodiment, potential power management issues associated with IR drop and headroom margin can be counteracted by treating the current source as a variable resistor. Rather than operating the entire display panel at a constant panel $V_{OP}$ level, the panel may be operated with dynamic panel $V_{OP}$ levels across the plurality of Vdd input lines 312 and the plurality of Vss lines 314. As a result, the headroom requirement may be reduced, and consequently, the bias of the driver transistor 455 may be reduced in the current source 454. In accordance with some embodiments, color tuning of the LED 470 emission is accomplished by the driver transistor 455 bias. In accordance with embodiments, color tuning may also be accomplished by modulating emission time of the LED 470.

Figure 5:
FIG. 5 is a timing diagram of a display panel in mono flash operation.
Figure 6:
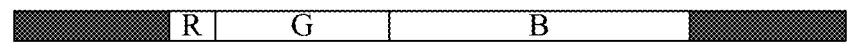
FIGS. 6-7 are timing diagrams of a display panel in sequential flash operation in accordance with embodiments.
Figure 7:

Referring now to FIGS. 5-7 various timing diagrams are providing for operating a display panel in a flash mode. An exemplary timing diagram of operating a display panel in mono flash mode is provided in FIG. 5. In a mono flash mode, each of the different subpixel groups (e.g. red, green, and blue-emitting subpixel groups) are operated simultaneously, with the same panel $V_{OP}$ level. FIGS. 6-7 are timing diagrams of a display panel in sequential flash operation in accordance with embodiments. As shown in FIGS. 6-7, the length of emission time for each subpixel group can be adjusted based on the light condition, color temperature, and other system considerations. In accordance with some embodiments, color tuning is accomplished by modulating emission time of the different subpixel groups in a sequential flash mode.

Figure 8:
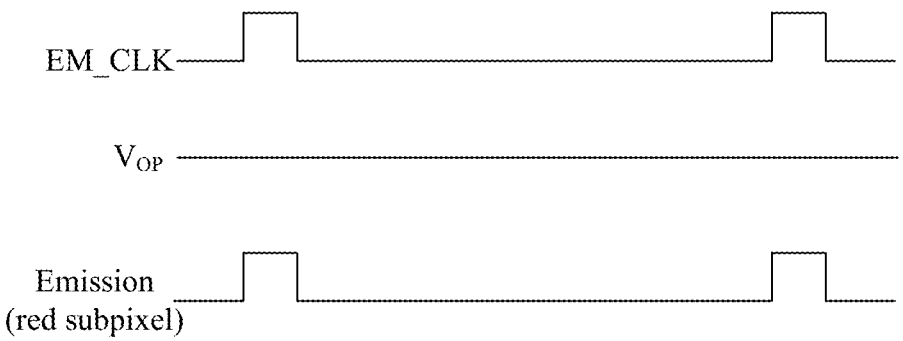
FIG. 8 is a timing diagram of subpixel emission in a display panel operated with a fixed panel operation voltage.

Referring now to FIG. 8 a timing diagram is provided of a subpixel group emission in a display panel operated with a fixed panel $V_{OP}$ level, such as 10 volts for example. In such a case, the subpixel emission is controlled by modulating the emission clock (EM_CLK) signal from the emission clock line 352 to the subpixel.

Figure 9:
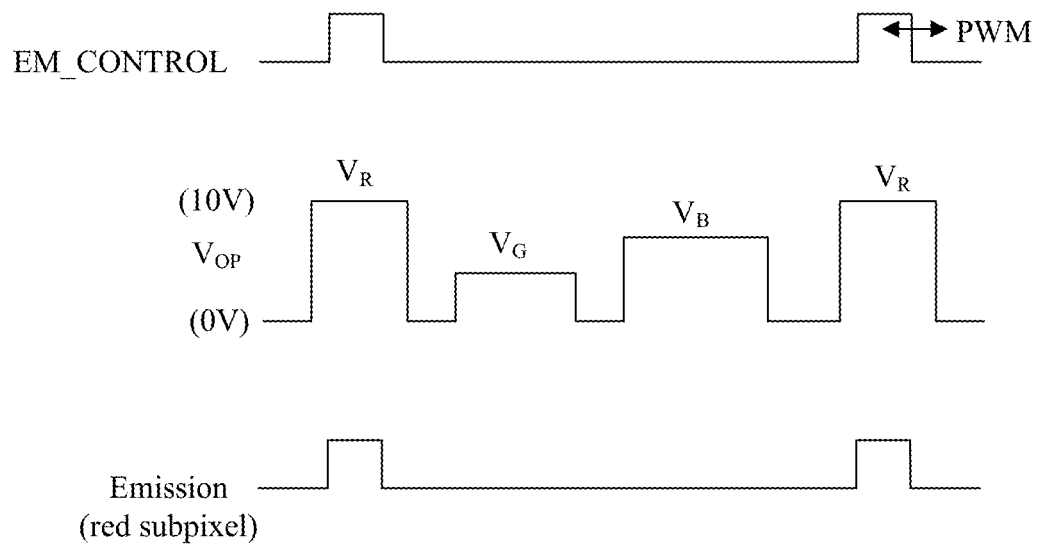
FIG. 9 is a timing diagram of subpixel emission in a display panel operated with a dynamic panel operation voltage in accordance with an embodiment.

FIG. 9 is a timing diagram of subpixel emission in a display panel operated with a dynamic panel $V_{OP}$ levels in accordance with an embodiment. As illustrated, in the dynamic mode, the panel $V_{OP}$ levels are modulated between different voltage levels ($V_R$, $V_G$, $V_B$) corresponding to emission of different subpixel groups. In an embodiment, the panel $V_{OP}$ level is reduced to a minimal level (e.g., 0V), or turned off between pulses in order to allow time for programming of the specific subpixel group. Emission of a particular subpixel group occurs during application of the specified panel $V_{OP}$ level of the subpixel, and application of an emission control signal (EM_CONTROL) to the subpixel.

In accordance with embodiments, the emission control (EM_CONTROL) signal may be a modulated emission clock (EM_CLK) signal from the emission clock line 352 to the emission switch 452 of the subpixel or a modulated current source pulse signal from the current source pulse line 354 to the driving transistor 454 of the subpixel. Thus, color tuning may be accomplished by modulating a pulse length from an emission controller to the emission switches 452 of the subpixel group, or modulating a current source pulse width to all driving transistors 455 of the subpixel group. In an embodiment, the end of the emission pulse width of subpixel group corresponds to an end of the pulse length from the emission controller to all of the emission switches 452 of the subpixel group. In an embodiment, the end of the emission pulse width of subpixel group corresponds to an end of the pulse length of the current source pulse width to all of the driving transistors 455 of the subpixel group.

Figure 10:
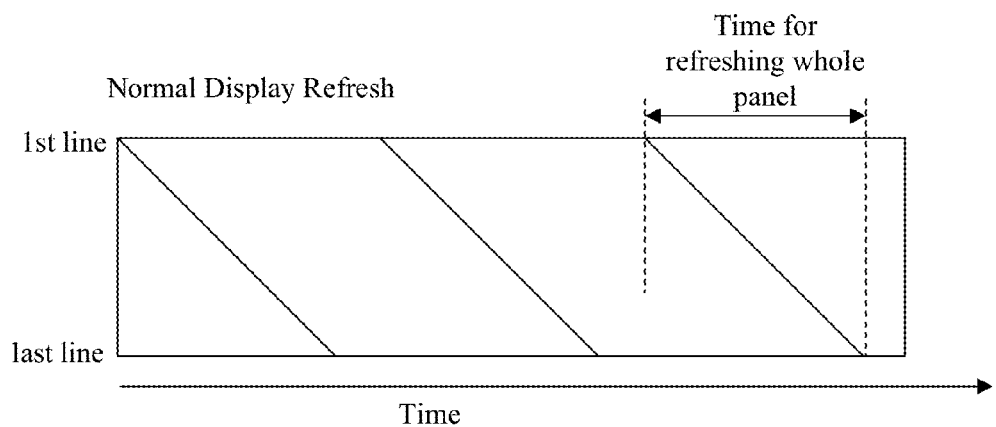
FIG. 10 is a timing diagram of a display panel operated in a normal display refresh rate.
Figure 11:
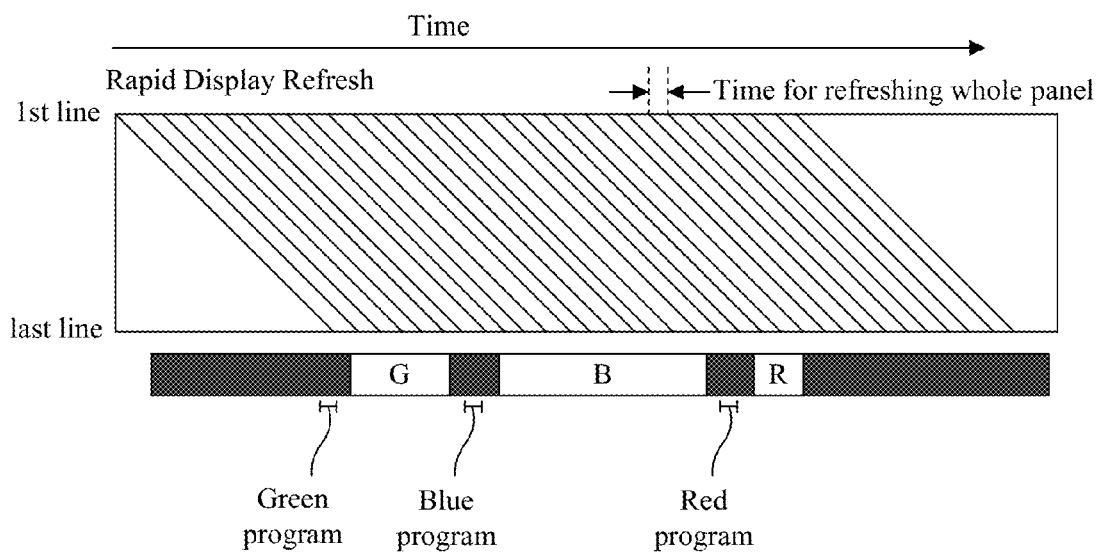
FIG. 11 is a timing diagram of a display panel operated in a rapid display refresh rate in accordance with an embodiment.

Referring now to FIGS. 10-11 timing diagrams of the gate in panel control of whole screen refresh rates are illustrated. FIG. 10 is a timing diagram of a display panel operated in a normal display refresh rate. As illustrated, under normal operating conditions of a display panel, the refresh of the first line may not occur until the last line has been refreshed. FIG. 11 is a timing diagram of a display panel operated in a rapid display refresh rate in accordance with an embodiment. As shown in FIG. 11, in accordance with embodiments refresh is started simultaneously for a plurality of rows within the display area. Additionally, this may occur during application of a $V_{OP}$ level across all of the Vdd input lines on the display panel. Thus, panel refresh may begin during emission of any of the pixel groups, or during the programming period prior to or between emission of the different pixel groups. In an embodiment, the panel may be OFF (not emitting) during the programming period. In accordance with embodiments, the rapid whole screen refresh allows for the sequential flash mode, as well as quickly updating content before changing subpixel groups for emission.

Figure 12:
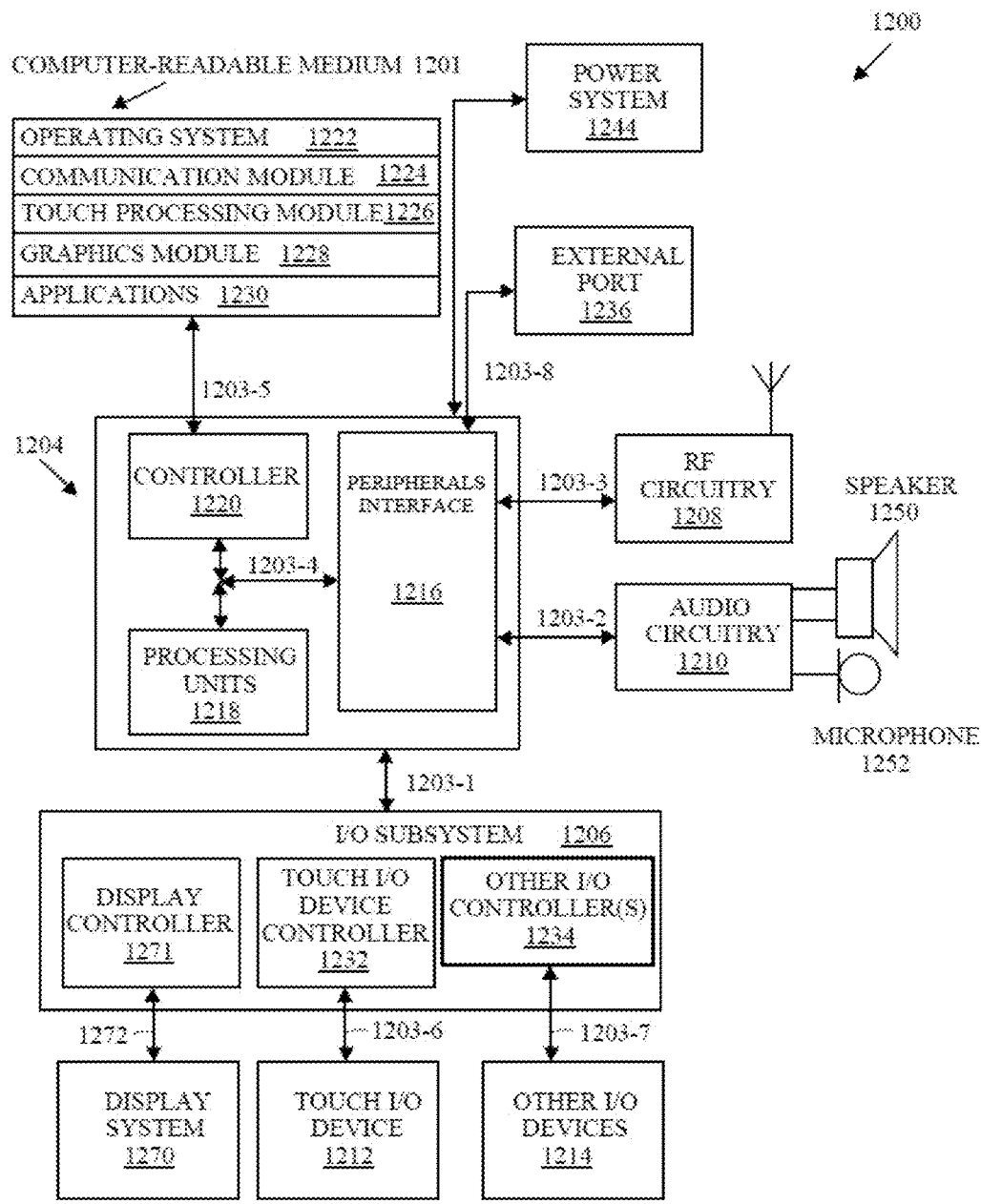
FIG. 12 is a block diagram of one embodiment of a system that generally includes one or more computer-readable mediums, processing system, Input/Output (I/O) subsystem, radio frequency (RF) circuitry and audio circuitry.
Figure 13:
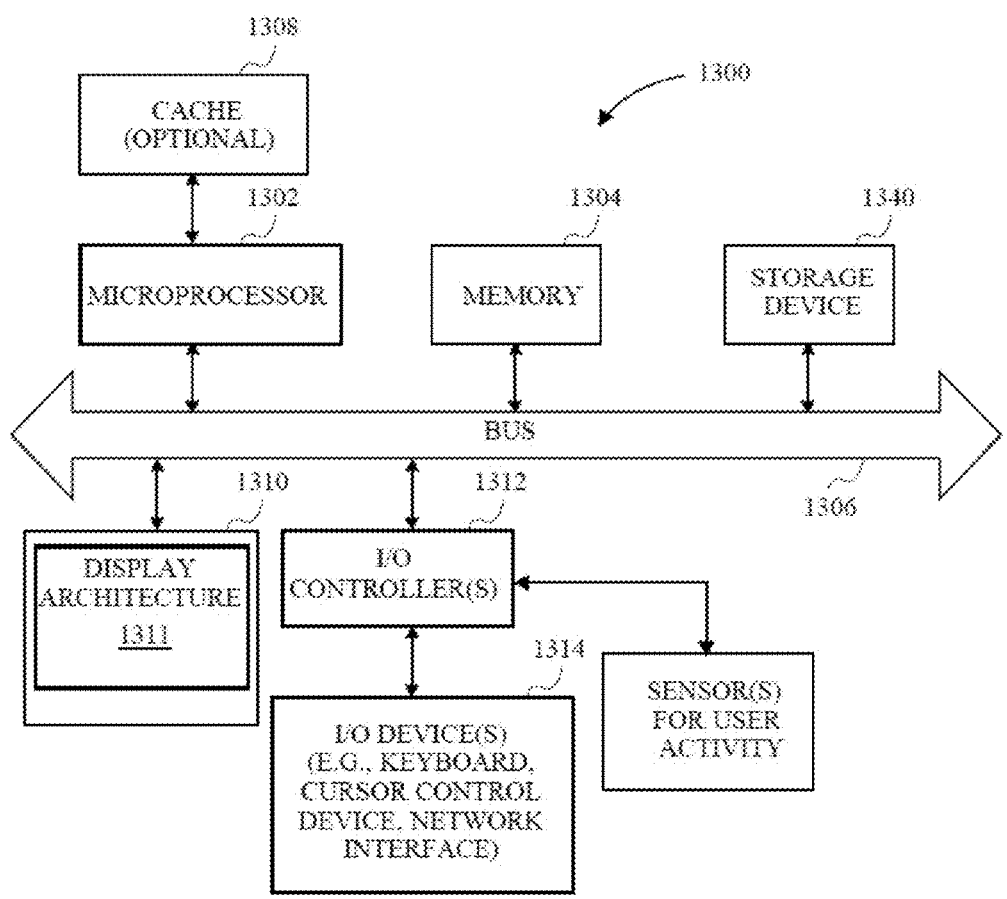
FIG. 13 shows another example of a device according to an embodiment.

In some embodiments, the methods, systems, and apparatuses of the present disclosure can be implemented in various devices including electronic devices, consumer devices, data processing devices, desktop computers, portable computers, wireless devices, cellular devices, tablet devices, display screens, televisions, handheld devices, multi touch devices, multi touch data processing devices, wearable devices, any combination of these devices, or other like devices. FIG. 12 and FIG. 13 illustrate examples of a few of these devices.

Attention is now directed towards embodiments of a system architecture that may be embodied within any portable or non-portable device including but not limited to a communication device (e.g., mobile phone, smart phone, smart watch, wearable device), a multi-media device (e.g., MP3 player, TV, radio), a portable or handheld computer (e.g., tablet, netbook, laptop), a desktop computer, an All-In-One desktop, a peripheral device, a television, or any other system or device adaptable to the inclusion of system architecture 1200, including combinations of two or more of these types of devices.

FIG. 12 is a block diagram of one embodiment of the system 1200 that generally includes one or more computer-readable mediums 1201, processing system 1204, Input/Output (I/O) subsystem 1206, radio frequency (RF) circuitry 1208 and audio circuitry 1210. These components may be coupled by one or more communication buses or signal lines 1203 (e.g., 1203-1, 1203-2, 1203-3, 1203-4, 1203-5, 1203-6, 1203-7, 1208-8).

It should be apparent that the architecture shown in FIG. 12 is only one example architecture of system 1200, and that system 1200 could have more or fewer components than shown, or a different configuration of components. The various components shown in FIG. 12 can be implemented in hardware, software, firmware or any combination thereof, including one or more signal processing and/or application specific integrated circuits.

RF circuitry 1208 is used to send and receive information over a wireless link or network to one or more other devices and includes well-known circuitry for performing this function. RF circuitry 1208 and audio circuitry 1210 are coupled to processing system 1204 via peripherals interface 1216. Interface 1216 includes various known components for establishing and maintaining communication between peripherals and processing system 1204. Audio circuitry 1210 is coupled to audio speaker 1250 and microphone 1252 and includes known circuitry for processing voice signals received from interface 1216 to enable a user to communicate in real-time with other users. In some embodiments, audio circuitry 1210 includes a headphone jack (not shown).

Peripherals interface 1216 couples the input and output peripherals of the system to processing units 1218 and computer-readable medium 1201. One or more processing units 1218 communicate with one or more computer-readable mediums 1201 via controller 1220. Computer-readable medium 1201 can be any device or medium (e.g., storage device, storage medium) that can store code and/or data for use by one or more processing units 1218. Medium 1201 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 1201 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processing units 1218 run various software components stored in medium 1201 to perform various functions for system 1200. In some embodiments, the software components include operating system 1222, communication module (or set of instructions) 1224, touch processing module (or set of instructions) 1226, graphics module (or set of instructions) 1228, and one or more applications (or set of instructions) 1230. In some embodiments, medium 1201 may store a subset of the modules and data structures identified above. Furthermore, medium 1201 may store additional modules and data structures not described above.

Operating system 1222 includes various procedures, sets of instructions, software components and/or drivers for controlling and managing general system tasks (e.g., memory management, storage device control, power management, etc.) and facilitates communication between various hardware and software components.

Communication module 1224 facilitates communication with other devices over one or more external ports 1236 or via RF circuitry 1208 and includes various software components for handling data received from RF circuitry 1208 and/or external port 1236.

Graphics module 1228 includes various known software components for rendering, animating and displaying graphical objects on a display surface. In embodiments in which touch I/O device 1212 is a touch sensitive display (e.g., touch screen), graphics module 1228 includes components for rendering, displaying, and animating objects on the touch sensitive display. The display architecture (e.g., display system 300 architecture) of the present design, which may be implemented with display controller 1271 and display system 1270, may be implemented in at least one of the touch I/O device and the touch I/O device controller or may be located as separate components. The display controller and display system are coupled via communication link 1272.

One or more applications 1230 can include any applications installed on system 1200, including without limitation, a game center application, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 1226 includes various software components for performing various tasks associated with touch I/O device 1212 including but not limited to receiving and processing touch input received from I/O device 1212 via touch I/O device controller 1232.

FIG. 13 shows another example of a device according to an embodiment of the disclosure. This device 1300 may include one or more processors, such as microprocessor(s) 1302, and a memory 1304, which are coupled to each other through a bus 1306. The device 1300 may optionally include a cache 1308 which is coupled to the microprocessor(s) 1302. The device may optionally include a storage device 1340 which may be, for example, any type of solid-state or magnetic memory device. Storage device 1340 may be or include a machine-readable medium.

This device may also include a display controller and display device 1310 which is coupled to the other components through the bus 1306. The display architecture 1311 (e.g., display system 300 architecture) of the present design may be implemented in the display controller and display device 1310.

One or more input/output controllers 1312 are also coupled to the bus 1306 to provide an interface for input/output devices 1314 and to provide an interface for one or more sensors 1316 which are for sensing user activity. The bus 1306 may include one or more buses connected to each other through various bridges, controllers, and/or adapters as is well known in the art. The input/output devices 1314 may include a keypad or keyboard or a cursor control device such as a touch input panel. Furthermore, the input/output devices 1314 may include a network interface which is either for a wired network or a wireless network (e.g. an RF transceiver). The sensors 1316 may be any one of the sensors described herein including, for example, a proximity sensor or an ambient light sensor. In at least certain implementations of the device 1300, the microprocessor(s) 1302 may receive data from one or more sensors 1316 and may perform the analysis of that data in the manner described herein.

In certain embodiments of the present disclosure, the device 1300 or device 1200 or combinations of devices 1200 and 1300 can be used to drive display data to a display device and implement at least some of the methods discussed in the present disclosure.

In utilizing the various aspects of the embodiments, it would become apparent to one skilled in the art that combinations or variations of the above embodiments are possible for operating a display panel in flash mode. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A method of driving a display panel in a sequential flash mode comprising:

time multiplexing between at least two panel operation voltage ($V_{OP}$) levels including a first $V_{OP}$ level and a second $V_{OP}$ level across all Vdd input lines to a display area;

emitting only a first wavelength range from only a first subpixel group designed for a first color emission during application of the first $V_{OP}$ level across all of the Vdd input lines and emitting only a second wavelength range from only a second subpixel group designed for a second color emission different from the first color during application of the second $V_{OP}$ level across all of the Vdd input lines, such that only the first color corresponding to the first wavelength range is emitted during application of the first $V_{OP}$ level across all of the Vdd input lines and only the second color corresponding to the second wavelength range is emitted during application of the second $V_{OP}$ level across all of the Vdd input lines.

2. The method of claim 1, wherein the second $V_{OP}$ level is applied across all of the Vdd input lines for a longer period of time than the first $V_{OP}$ level is applied across all of the Vdd input lines.

3. The method of claim 2, further comprising time multiplexing to a third $V_{OP}$ level between the first $V_{OP}$ level and the second $V_{OP}$ level, wherein the third $V_{OP}$ level is lower than both the first $V_{OP}$ level and the second $V_{OP}$ level.

4. The method of claim 3, wherein the third $V_{OP}$ level is 0 volts.

5. The method of claim 3, further comprising updating data content for the second subpixel group during application of the third $V_{OP}$ level and prior to application of the second $V_{OP}$ level.

6. The method of claim 1, further comprising simultaneously starting refresh of a first plurality of rows within the display area during application of the first $V_{OP}$ level across all of the Vdd input lines.

7. The method of claim 6, further comprising simultaneously starting refresh of a second plurality of rows within the display area during application of the second $V_{OP}$ level across all of the Vdd input lines.

8. The method of claim 1, further comprising:
modulating an emission pulse width of the first subpixel group by modulating a pulse length from an emission controller to the first subpixel group.

9. The method of claim 8, wherein an end of the emission pulse width of first subpixel group corresponds to an end of the pulse length from the emission controller to the first subpixel group.

10. The method of claim 1, further comprising:
modulating an emission pulse width of the first subpixel group by modulating a current source pulse width to all driving transistors of the first subpixel group.

11. The method of claim 10, wherein an end of the emission pulse width of the first subpixel group corresponds to an end of a pulse length of the current source pulse width to all of the driving transistors of the first subpixel group.

12. A non-transitory machine-readable medium having executable instructions to cause one or more processing units to perform a method to drive a display panel a sequential flash mode, the method comprising:
time multiplexing between at least two panel operation voltage ($V_{OP}$) levels including a first $V_{OP}$ level and a second $V_{OP}$ level across all Vdd input lines to a display area;
emitting only a first wavelength range from only a first subpixel group designed for a first color emission during application of the first $V_{OP}$ level across all of the Vdd input lines and emitting only a second wavelength range from only a second subpixel group designed for a second color emission different from the first color during application of the second $V_{OP}$ level across all of the Vdd input lines, such that only the first color corresponding to the first wavelength range is emitted during application of the first $V_{OP}$ level across all of the Vdd input lines and only the second color corresponding to the second wavelength range is emitted during application of the second $V_{OP}$ level across all of the Vdd input lines.

13. The non-transitory machine-readable readable medium as in claim 12, further comprising time multiplexing to a third $V_{OP}$ level between the first $V_{OP}$ level and the second $V_{OP}$ level, wherein the third $V_{OP}$ level is lower than both the first $V_{OP}$ level and the second $V_{OP}$ level.

14. The non-transitory machine-readable readable medium as in claim 12, further comprising simultaneously starting refresh of a first plurality of rows within the display area during application of the first $V_{OP}$ level across all of the Vdd input lines.

15. The non-transitory machine-readable readable medium as in claim 14, further comprising simultaneously starting refresh of a second plurality of rows within the display area during application of the second $V_{OP}$ level across all of the Vdd input lines.

16. The non-transitory machine-readable readable medium as in claim 12, further comprising modulating an emission pulse width of the first subpixel group by modulating a pulse length from an emission controller to the first subpixel group.

17. The non-transitory machine-readable readable medium as in claim 12, further comprising modulating a current source pulse width to all driving transistors of the first subpixel group.

* * * * *